(12) United States Patent
Kim (10) Patent No.: US 12,120,330 B2
(45) Date of Patent: Oct. 15, 2024

(54) IMAGE TRANSMISSION DEVICE AND IMAGE RECEPTION DEVICE

(71) Applicant: LG ELECTRONICS INC., Seoul (KR)

(72) Inventor: Dongsung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 74 days.

(21) Appl. No.: 18/021,119

(22) PCT Filed: Aug. 25, 2020

(86) PCT No.: PCT/KR2020/011337
§ 371 (c)(1),
(2) Date: Feb. 13, 2023

(87) PCT Pub. No.: WO2022/045389
PCT Pub. Date: Mar. 3, 2022

(65) Prior Publication Data
US 2023/0300355 A1    Sep. 21, 2023

(51) Int. Cl.
*H04N 19/42*  (2014.01)
*H04B 7/06*  (2006.01)
(Continued)

(52) U.S. Cl.
CPC .......... *H04N 19/42* (2014.11); *H04B 7/0608* (2013.01); *H04N 5/58* (2013.01); *H04N 21/4363* (2013.01); *H04N 21/4436* (2013.01)

(58) Field of Classification Search
CPC .... A61K 2239/47; A61K 35/15; A61K 35/17; A61K 35/28; A61K 35/545; A61K 38/00;
(Continued)

(56) References Cited

U.S. PATENT DOCUMENTS 7,509,090 B2 *  3/2009  Yamauchi ............. H04L 1/0014
455/3.06
2011/0006690 A1 *  1/2011  Hoffman ............ H04N 21/4424
315/149
(Continued)

FOREIGN PATENT DOCUMENTS

EP  3065127  9/2016
KR  10-2006-0013506  2/2006
(Continued)

OTHER PUBLICATIONS

1 European Patent Office Application Serial No. 20951622.8, Search Report dated Feb. 21, 2024, 7 pages.
(Continued)

*Primary Examiner* — Asghar H Bilgrami
(74) *Attorney, Agent, or Firm* — LEE, HONG, DEGERMAN, KANG & WAIMEY (57) ABSTRACT

An image transmission device including a content compression unit configured to compress an image signal, a wireless transmission unit configured to wirelessly transmit the compressed image signal to an image reception device, and a processor configured to switch a power mode of the image transmission device to a low power mode based on a determination that an image signal is not being received from an external source or that an ambient brightness at the image reception device is less than a preset brightness, and control the content compression unit to increase a compression rate of the image signal in the low power mode.

8 Claims, 9 Drawing Sheets

(51) Int. Cl.
*H04N 5/58* (2006.01)
*H04N 21/422* (2011.01)
*H04N 21/436* (2011.01)
*H04N 21/4363* (2011.01)
*H04N 21/4402* (2011.01)
*H04N 21/443* (2011.01)

(58) Field of Classification Search
CPC ............ A61K 39/4611; A61K 39/4631; A61K 39/4632; A61K 39/464499; C07K 14/4748; C07K 14/7051; C40B 40/08; G16B 15/30; G16B 20/00; G16B 30/10; G16B 40/10; H04B 7/0608; H04N 19/42; H04N 21/42202; H04N 21/436; H04N 21/4363; H04N 21/4402; H04N 21/44227; H04N 21/4424; H04N 21/4436; H04N 5/58
See application file for complete search history.

(56) References Cited

U.S. PATENT DOCUMENTS

2011/0117858 A1   5/2011  Lee
2018/0014022 A1*  1/2018  Cho ...................... H04N 19/103
2019/0342569 A1*  11/2019  Kim ................. H04N 21/43615

FOREIGN PATENT DOCUMENTS

| KR | 10-2008-0067240 | 7/2008 |
| KR | 10-2010-0012513 | 2/2010 |
| KR | 10-2016-0076309 | 6/2016 |
| KR | 10-2019-0127610 | 11/2019 |

OTHER PUBLICATIONS

PCT International Application No. PCT/KR2020/011337, International Search Report dated May 24, 2021, 4 pages.

* cited by examiner

| AMBIENT BRIGHTNESS (lux) | COMPRESSION RATE OF THE IMAGE SIGNAL (%) |
|---|---|
| 30 | 60 |
| 60 | 50 |
| 90 | 40 |

FIG. 9

IMAGE TRANSMISSION DEVICE AND IMAGE RECEPTION DEVICE

CROSS-REFERENCE TO RELATED APPLICATION

This application is the National Stage filing under 35 U.S.C. 371 of International Application No. PCT/KR2020/011337, filed on Aug. 25, 2020, the contents of which are incorporated by reference herein in its entirety.

TECHNICAL FIELD

The present disclosure relates to a wireless display system for wirelessly transmitting and receiving A/V data.

BACKGROUND

As image technology changes from analog to digital, it has evolved from SD (Standard-Definition) to HD (Hi-Definition) to provide clearer images.

SD supports a resolution of 704×480 and consists of about 350,000 pixels, and HD is divided into HD and Full HD. Full HD supports a resolution of 1920×1080 and has 2 million pixels to provide a high quality image compared to the SD.

Recently, image technology is growing one step further to UHD (Ultra High-Definition) beyond Full HD, and the UHD supporting ultra-high definition and ultra-high resolution is in the limelight as a next-generation media environment. The UHD supports 4K (3840×2160) and 8K (7680×4320) resolutions and up to 22.2 channels of surround audio.

UHD, such as 4K UHD, provides 4 times clearer picture quality compared to HD, and 8K UHD provides 16 times clearer picture quality compared to HD.

However, according to the existing technologies, there is a problem in that low transmission power and reception power cannot be used since image signals are transmitted in the same manner regardless of ambient brightness or whether there is a signal input to the transmission device.

An object of the present disclosure is to reduce power consumption in a wireless display system by considering ambient brightness or the presence or absence of a signal input from the outside.

An object of the present disclosure is to reduce power consumption while maximally maintaining a viewer's viewing environment in a wireless display system.

An image transmission device according to an embodiment of the present disclosure may comprise: a content compression unit configured to compress an image signal, a wireless transmission unit configured to wirelessly transmit the compressed image signal to an image reception device, and a processor configured to switch a power mode of the image transmission device to a low power mode based on a determination that an image signal is not being received from an external source or that an ambient brightness at the image reception device is less than a preset brightness, and control the content compression unit to increase a compression rate of the image signal in the low power mode.

An image reception device according to an embodiment of the present disclosure may comprise: a wireless reception unit configured to wirelessly receive an image signal from an image transmission device, a content restoration unit configured to decompress the received image signal, a display configured to display an image corresponding to the decompressed image signal, an illuminance sensor configured to measure an ambient brightness at the display; and a microcomputer configured to switch a power mode of the image reception device to a low power mode based on the ambient brightness being less than a preset brightness.

According to an embodiment of the present disclosure, when an image signal is not input from the outside, the display system operates in a low power mode, thereby reducing power consumption.

According to an embodiment of the present disclosure, even when the viewer's surroundings are dark, power consumption can be reduced as the display system operates in a low power mode, and the viewer can watch the image without feeling a change in image quality.

DETAILED DESCRIPTION

Hereinafter, embodiments relating to the present disclosure will be described in detail with reference to the drawings. The suffixes "module" and "unit" for components used in the description below are assigned or mixed in consideration of easiness in writing the specification and do not have distinctive meanings or roles by themselves.

An image transmission device according to an embodiment of the present disclosure is, for example, an intelligent display device in which a computer support function is added to a broadcast reception function, and is faithful to a broadcast reception function and has an Internet function added thereto, with a user interface such as a handwritten input device, a touch screen, and the like. Alternatively, a more user-friendly interface such as a spatial remote control may be provided. In addition, it is connected to the Internet and a computer with the support of a wired or wireless Internet function, so that functions such as e-mail, web browsing, banking, or games can also be performed.

Accordingly, since various applications can be freely added or deleted on the general-purpose OS kernel, for example, the image transmission device described in the present disclosure can perform various user-friendly functions.

Figure 1:
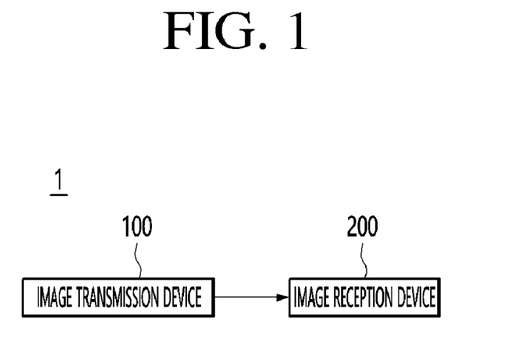
FIGS. 1 to 3 are diagrams illustrating the configuration of a display system according to an embodiment of the present disclosure.
Figure 2:
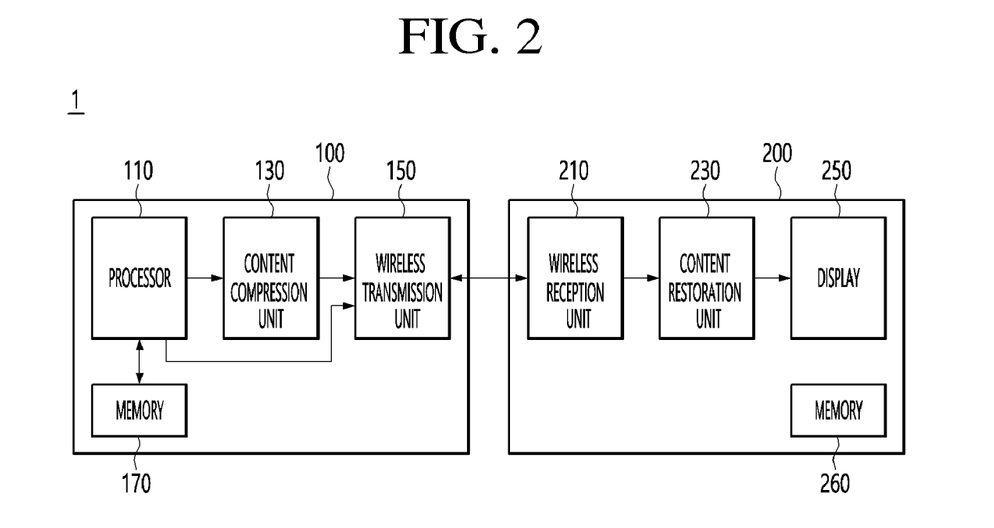
Figure 3:
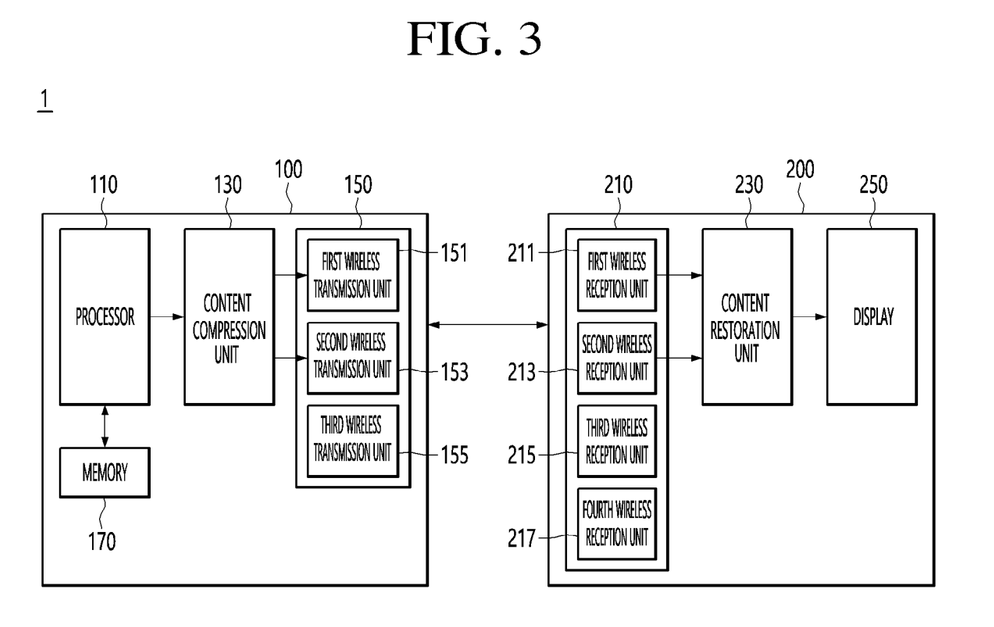

FIGS. 1 to 3 are diagrams illustrating the configuration of a display system according to an embodiment of the present disclosure.

Referring to FIG. 1, a display system 1 according to an embodiment of the present disclosure includes an image transmission device 100 and an image reception device 200.

The display system 1 may be a system in which the image transmission device 100 wirelessly transmits A/V data to the image reception device 200 and the image reception device 200 outputs the A/V data.

The image transmission device 100 may be a device capable of encoding content image and audio and wirelessly transmitting the encoded content image and audio.

The image transmission device 100 may be a set-top box.

The image reception device 200 may be a display device capable of wirelessly receiving encoded content image and audio, and decoding the received content image and audio.

The image transmission device 100 and the image reception device 200 may constitute an image wall display system.

In an image wall, having a display with a thin bezel plays an important role in visualizing content images. For the thin bezel of the display, it is beneficial to include only minimum necessary elements for displaying content images at the display, and to perform the main functionality in a separate device.

The image transmission device 100 may determine the type of content image received from external sources, and determine a compression rate of the content image based on the determined type. The compression rate of the content image may represent a compression ratio of the data size of the content image.

The type of content image may include a still image type, a general image type, and a game image type.

The image transmission device 100 may compress the content image according to the determined compression rate and wirelessly transmit the compressed content image to the image reception device 200.

The image reception device 200 may restore the compressed content image received from the image transmission device 100 and display the restored content image on a display.

FIG. 2 is a block diagram illustrating detailed configurations of an image transmission device 100 and an image reception device 200.

Referring to FIG. 2, the image transmission device 100 may include a processor 110, a content compression unit 130, a wireless transmission unit 150, and a memory 170.

The processor 110 may control the overall operation of the image transmission device 100. The processor 110 may be configured in the form of a System on Chip (SoC).

The processor 110 may be provided in plurality.

The processor 110 may determine a compression rate for audio or image received from the external source according to the type of content image, and deliver one or more of audio or image data to the content compression unit 130 according to the determined compression rate.

The content compression unit 130 may compensate for disconnection of the content image or disconnection of a wireless connection by changing the compression rate of content image according to the wireless connection quality. A content image may include one or more of audio and image data.

The content compression unit 130 may reduce the data transmission rate (meaning to increase the compression rate) if the wireless connection quality is poor.

The content compression unit 130 can increase the data transmission rate (meaning to keep the compression rate low) if the wireless connection quality is good.

The content compression unit 130 may be referred to as an encoder.

The wireless transmission unit 150 may wirelessly transmit the content image compressed by the content compression unit 130 to the image reception device 200.

The memory 170 may store one or more signal patterns used to synchronize an AV signal and a control signal matching the AV signal.

Referring to FIG. 3, the wireless transmission unit 150 may include a first wireless transmission unit 151, a second wireless transmission unit 153, and a third transmission unit 155.

The wireless transmission unit 150 may transmit the compressed content image to the wireless reception unit 210 of the image reception device 200 through two channels.

That is, each of the first wireless transmission unit 151 and the second wireless transmission unit 153 may transmit the compressed content image to the first wireless reception unit 211 and the second wireless reception unit 213 of the image reception device 200.

In one embodiment, the reason for using 2 channels is to reduce transmission delay by transmitting compressed content image through a channel with better wireless quality.

In another embodiment, the reason for using 2 channels may be to divide the content image through 2 channels and transmit the content image since the amount of data to transmit is large in the case of a 4K resolution content image, for example.

Each of the first wireless transmission unit 151 and the second wireless transmission unit 153 may include a base band module for base band communication and an RF module for RF communication.

The baseband module may generate unmodulated low frequency data of the compressed content image and transmit it to the RF module.

The RF module may convert data of a low frequency band into high frequency band data according to a radio frequency (RF) communication standard, and transmit the converted data of the content image to the image reception device 200.

The third wireless transmission unit 155 may perform BLE communication with the remote control device 400 to be described later. To this end, the third wireless transmission unit 155 may include a Wi-Fi module or a BLE module (BLE circuit) supporting the BLE standard.

The image reception device 200 may include a wireless reception unit 210, a content restoration unit 230 and a display 250.

The wireless reception unit 210 may include a first wireless reception unit 211, a second wireless reception unit 213, a third wireless reception unit 215 and a fourth wireless reception unit 217.

That is, the wireless receiver 210 may also be configured with two channels.

Each of the first wireless reception unit 211 and the second wireless reception unit 213 may include a base band module for base band communication and an RF module for RF communication.

The RF module may receive data in a high frequency band from the image transmission device 100 according to radio frequency (RF) communication standards.

The baseband module may convert high frequency band data into low frequency band data.

The third wireless reception unit 215 may be used for pairing with the image transmission device 100. To this end, the third wireless reception unit 215 may include a BLE module (BLE circuit).

The content restoration unit 230 may decode the content image received through the wireless reception unit 210.

The content restoration unit 230 may restore the compressed content image to a content image having an original size.

The content restoration unit 230 may include a decoder.

The display 250 may display the restored content image.

The image reception device 200 may further include a memory 260. The image reception device 200 may store information received from the image transmission device 100 and a program for executing an application.

Figure 4:
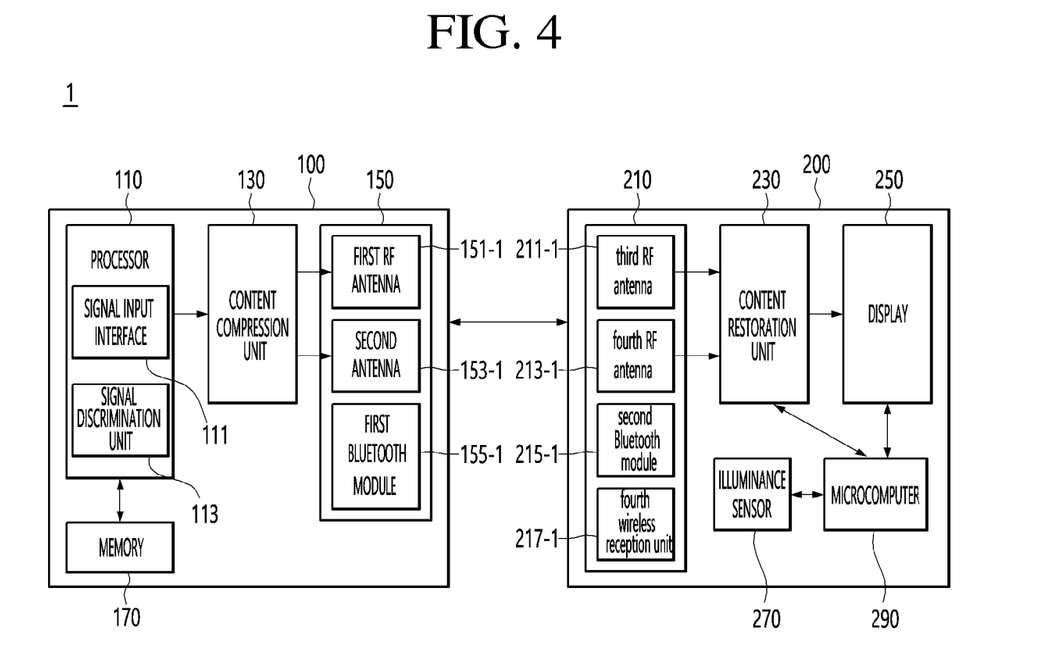
FIG. 4 is a diagram illustrating a configuration of a display system according to another embodiment of the present disclosure.

FIG. 4 is a diagram illustrating a configuration of a display system according to another embodiment of the present disclosure.

In FIG. 4, detailed descriptions of contents overlapping those described in FIGS. 2 and 3 are omitted.

The image transmission device 100 may include a processor 110, a content compression unit 130, a wireless transmission unit 150, and a memory 170.

The processor 110 may include a signal input interface 111 and a signal discrimination unit 113.

The signal input interface 111 may be an interface for receiving an A/V signal from an external device. The signal input interface 111 may include one or more of an HDMI terminal or an A/V terminal.

The signal determination unit 113 may determine whether an image signal is input to the signal input interface 111.

The wireless transmission unit 150 may include a first RF antenna 151-1, a second RF antenna 153-1, and a first Bluetooth module 155-1.

Each of the first RF antenna 151-1 and the second RF antenna 153-1 may transmit an A/V signal to the image reception device 200 through RF communication (one-way communication).

The first Bluetooth module 155-1 may perform bi-directional communication with the second Bluetooth module 215-1 of the image reception device 200 according to the Bluetooth standard.

Each of the first Bluetooth module 155-1 and the second Bluetooth module 215-1 may be used for pairing or to exchange information other than A/V signals.

The image reception device 200 may include a wireless reception unit 210, a content restoration unit 230, a display 250, an illuminance sensor 270, and a microcomputer 290.

The wireless reception unit 210 may include a third RF antenna 211-1, a fourth RF antenna 213-1, a second Bluetooth module 215-1, and a fourth wireless reception unit 217.

The third RF antenna 211-1 and the fourth RF antenna 213-1 can receive A/V signals from the first RF antenna 151-1 and the second RF antenna 153-1, respectively, through RF communication.

The illuminance sensor 270 may be disposed on one side of the display 250 to measure ambient brightness. The illuminance sensor 270 may transmit the measured brightness to the microcomputer 290.

The microcomputer 290 may determine whether the measured brightness is less than a preset brightness. The microcomputer 290 may switch the power mode of the image reception device 200 from a normal power mode to a low power mode when the measured brightness is less than a preset brightness.

At the same time, the microcomputer 290 may transmit a power mode switching request message requesting the image transmission device 100 to switch to a low power mode.

The power mode change request message may include the measured brightness.

The microcomputer 290 may control overall operations of the image reception device 200.

Figure 5:
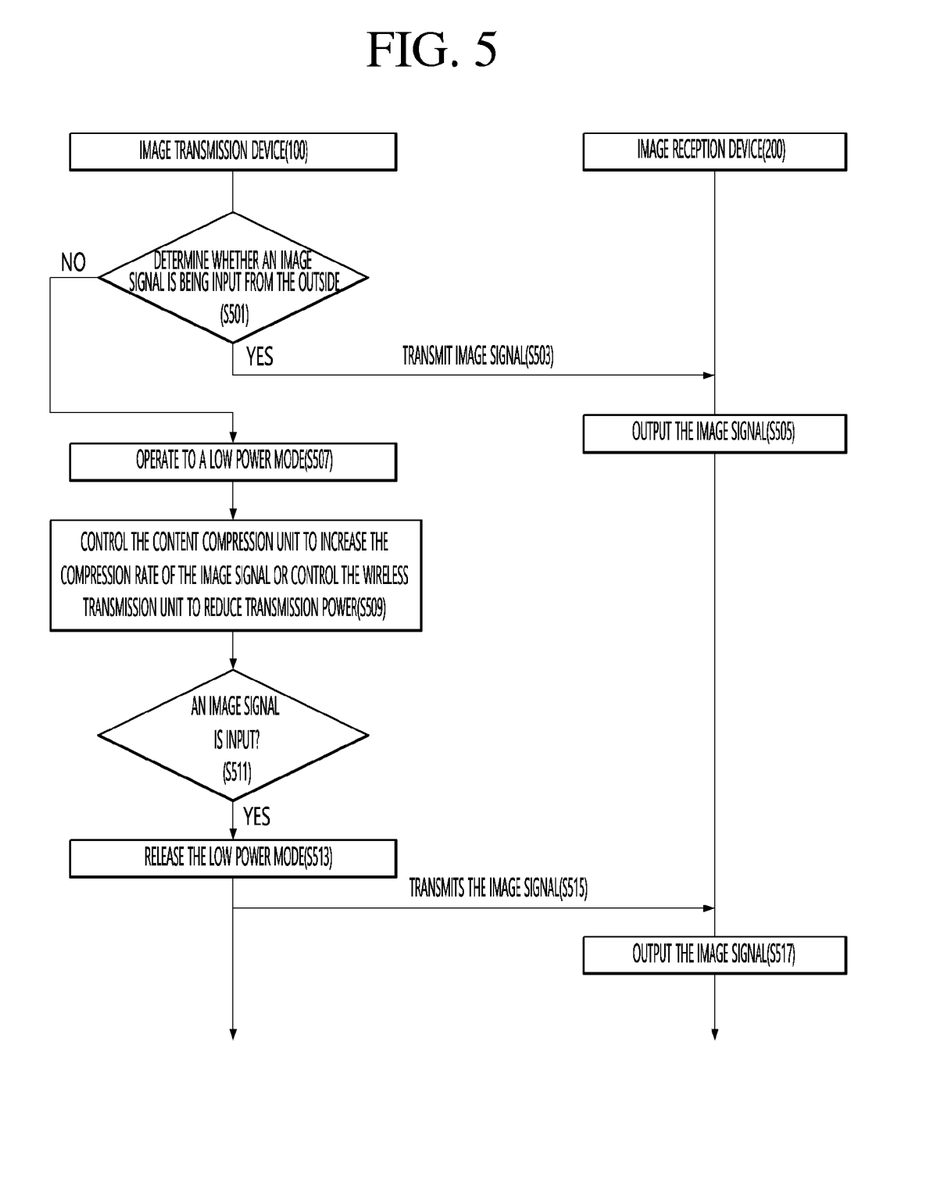
FIG. 5 is a ladder diagram illustrating a method of operating a display system according to an embodiment of the present disclosure.

FIG. 5 is a ladder diagram illustrating a method of operating a display system according to an embodiment of the present disclosure.

In particular, FIG. 5 is an embodiment of determining whether to switch the power mode to the low power mode according to the presence or absence of an image signal input to the image transmission device 100.

Referring to FIG. 5, the display system may include an image transmission device 100 and an image reception device 200.

Hereinafter, it is assumed that the image transmission device 100 and the image reception device 200 are paired through a short-range wireless communication standard.

The short-range wireless communication standard may be either a Bluetooth standard or a Bluetooth low energy standard.

The processor 110 of the image transmission device 100 determines whether an image signal is being received from an external source, also referred to as the outside (S501).

The signal input interface 111 provided in the processor 110 may determine whether an image signal is being received from an external source, also referred to as the outside.

The signal input interface 111 may include one or more of an HDMI terminal or an A/V terminal.

The signal input interface 111 may determine whether an A/V signal is being input through an external input terminal.

The signal input interface 111 may output a high signal when the A/V signal is being input, and output a low signal when the A/V signal is not being input.

The signal determination unit 113 included in the processor 110 may determine that an external image signal is being input when the signal input interface 111 outputs a high signal.

When the image signal is being input, the processor 110 of the image transmission device 100 compresses the input image signal and transmits the compressed image signal to the image reception device 200 through the wireless transmission unit 150 (S503).

The processor 110 may control the content compressor 130 to compress the image signal at a predetermined compression rate.

The preset compression rate may be a compression rate set by a user or a default compression rate.

The image reception device 200 decompresses the image signal received from the image transmission device 200 and outputs the decompressed image signal through the display 250 (S505).

When an image signal is not input, the processor 110 of the image transmission device 100 operates the power mode of the image transmission device 100 to a low power mode (S517).

The processor 110 may switch the power mode of the image transmission device 100 from a normal power mode to a low power mode when an image signal is not being input to the signal input interface 111.

The power mode of the image transmission device 100 may include a normal power mode and a low power mode.

The low power mode may be a mode for reducing power consumption compared to the normal power mode.

The low power mode may be a mode for increasing a compression rate of an image signal or reducing transmission power of an RF antenna included in the wireless transmission unit 150.

Under the low power mode, the processor 110 of the image transmission device 100 controls the content compression unit 130 to increase the compression rate of the image signal or controls the wireless transmission unit 150 to reduce transmission power (S509).

The processor 110 may control the content compression unit 130 to change the compression rate of the image signal from a first compression rate to a second compression rate greater than the first compression rate.

The processor 110 may control one or more RF antennas provided in the wireless transmission unit 150 to increase the compression ratio of the image signal and reduce transmission power.

Accordingly, even with low power, an image signal can be transmitted to the image reception device 200, and power consumption can be reduced.

The processor 110 may change the arrangement angle of one or more RF transmission antennas provided in the wireless transmission unit 150 to reduce transmission power.

As another example, the processor 110 may control the RF transmission antenna to change the beam transmission angle of the RF transmission antenna.

The RF transmission antenna may be at least one of the first RF antenna 151-1 and the second RF antenna 151-3 of FIG. 4.

The RF transmission antenna may be an antenna transmitting to the image reception device 200. The RF transmission antenna can wirelessly transmit A/V signals through a frequency band of 60 GHz.

As the signal transmission angle of the RF transmission antenna is changed, transmission power may be changed.

The processor 110 may adjust the arrangement of the RF transmission antenna at a preset angle in the low power mode.

Meanwhile, when an image signal is not being input from the outside, a target for adjusting the compression rate may be an image signal corresponding to a background image displayed by the image reception device 200 in a standby mode.

Meanwhile, the processor 110 may transmit a power mode switching request message to the image reception device 200 while switching the power mode of the image transmission device 100 to the low power mode.

The power mode change request message may be a message requesting to change the power mode of the image reception device 200 to a low power mode.

After that, the processor 110 of the image transmission device 100 re-determines whether an image signal is being input from the outside (S511), and releases the low power mode of the image transmission device 100 when it is determined that an image signal is being input. (S513).

That is, the processor 110 may switch the power mode of the image transmission device 100 from the low power mode to the normal power mode when it is determined that an image signal is being input from the outside.

The processor 110 of the image transmission device 100 compresses the input image signal and transmits the compressed image signal to the image reception device 200 (S515).

In this case, the processor 110 may control the content compression unit 130 to change the compression rate of the image signal from the second compression rate to a first compression rate smaller than the second compression rate.

The image reception device 200 decompresses the received image signal and outputs the decompressed image signal (S517).

Next, FIG. 6 will be described.

Figure 6:
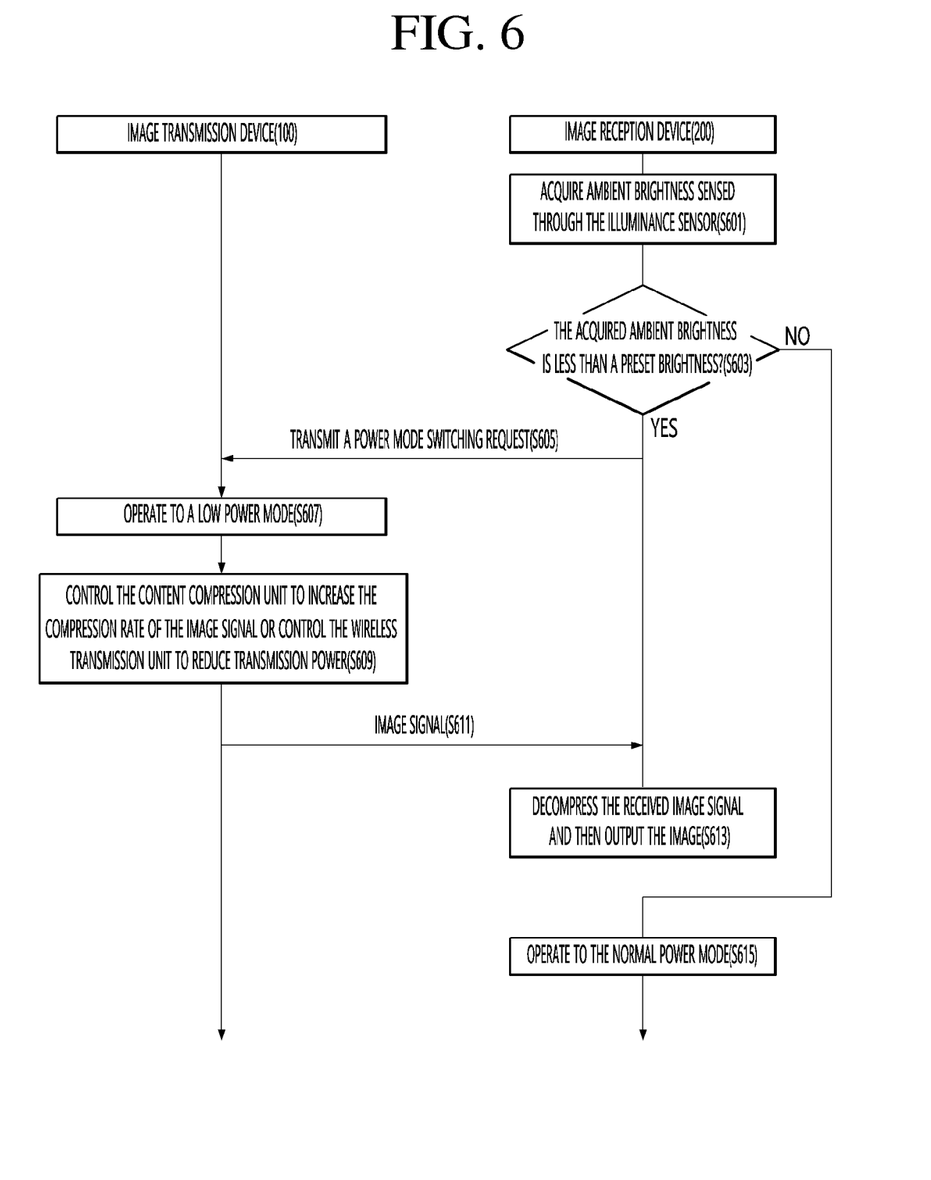
FIG. 6 is a ladder diagram illustrating a method of operating a display system according to another embodiment of the present disclosure.

FIG. 6 is a ladder diagram illustrating a method of operating a display system according to another embodiment of the present disclosure.

In particular, FIG. 6 is an embodiment of determining whether to switch the power mode to the low power mode according to the brightness measured by the illuminance sensor.

The illuminance sensor may be provided in the image reception device 200.

Hereinafter, it is assumed that the image transmission device 100 and the image reception device 200 are paired through a short-range wireless communication standard.

The short-range wireless communication standard may be a Bluetooth standard.

Referring to FIG. 6, the microcomputer 290 of the image reception device 200 acquires ambient brightness sensed through the illuminance sensor 270 (S601).

An illuminance sensor 270 may be provided on one side of the image reception device 200. In particular, the illuminance sensor 270 may be disposed on one side of the display 250.

The illuminance sensor 270 may periodically measure ambient brightness. The illuminance sensor 270 may transfer the measured ambient brightness to the microcomputer 290.

The microcomputer 290 of the image reception device 200 determines whether the acquired ambient brightness is less than a preset brightness (S603).

The preset brightness may be a standard brightness for determining whether the image reception device 200 is in a dark viewing environment.

The preset brightness may be set as a default or may be set according to a user input.

The microcomputer 290 of the image reception device 200 transmits a power mode switching request to the image transmission device 100 through the wireless reception unit 210 when the ambient brightness is less than the preset brightness (S605).

In an embodiment, the power mode change request message may be a message requesting a change from a power mode to a low power mode.

The microcomputer 290 may transmit a power mode switching request message to the first Bluetooth module 155-1 of the image transmission device 100 through the second Bluetooth module 215-1.

The power mode switching request message may include ambient brightness measured by the illuminance sensor 270.

Meanwhile, the microcomputer 290 of the image reception device 200 may switch its own power mode from a normal power mode to a low power mode when ambient brightness is less than a preset brightness.

The microcomputer 290 may adjust the arrangement angle of the RF reception antenna to reduce reception power in the low power mode.

The RF receiving antenna may be any one of the third RF antenna 211-1 or the fourth RF antenna 213-1 shown in FIG. 4.

The processor 110 of the image transmission device 100 operates its own power mode to a low power mode in response to the power mode change request message received from the image reception device 200 (S607).

The processor 110 of the image transmission device 100 may change its own power mode from the normal power mode to the low power mode in response to the power mode change request message.

In the low power mode, the processor 110 of the image transmission device 100 controls the content compression unit 130 to increase the compression rate of the image signal or controls the wireless transmission unit 150 to reduce transmission power (S609).

The processor 110 may control one or more RF antennas provided in the wireless transmission unit 150 to increase the compression ratio of the image signal and/or reduce transmission power.

Accordingly, even with low power, an image signal can be transmitted to the image reception device 200, and power consumption can be reduced.

The processor 110 may reduce transmission power by changing an angle of one or more RF antennas included in the wireless transmission unit 150.

The processor 110 may determine the compression ratio of the image signal according to the ambient brightness.

The processor 110 may obtain the ambient brightness measured by the illuminance sensor 270 from the power mode change request message received from the image reception device 200.

The processor 110 may determine a compression rate of the image signal corresponding to the obtained ambient brightness.

In an embodiment, the processor 110 may determine a compression rate of an image signal corresponding to ambient brightness using a table stored in the memory 170. This will be described with reference to FIG. 7.

Figure 7:
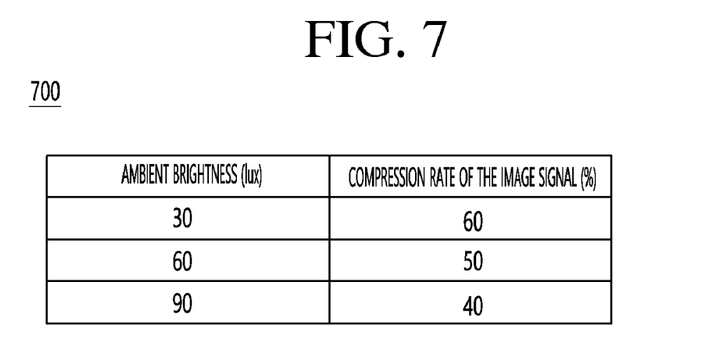
FIG. 7 is a diagram illustrating a table showing a correspondence relationship between ambient brightness and a compression ratio of an image signal according to an embodiment of the present disclosure.

FIG. 7 is a diagram illustrating a table showing a correspondence relationship between ambient brightness and a compression rate of an image signal according to an embodiment of the present disclosure.

The table of FIG. 7 may be stored in the memory 170 of the image transmission device 100.

The processor 110 of the image transmission device 100 may parse the ambient brightness from the power mode change request message received from the image reception device 200.

The processor 110 may determine a compression rate of the image signal corresponding to the parsed ambient brightness using the table 700.

For example, when the ambient brightness is 30 (lux), the processor 110 may determine the compression rate of the image signal as 60% through the table 700.

The processor 110 may transmit the determined compression ratio of the image signal to the content compression unit 130. The content compression unit 130 may compress the image signal according to the received compression rate.

The processor 110 may increase the compression rate of the image signal as the ambient brightness becomes darker.

That is, if the ambient brightness of the image reception device 200 is low, the user may be less sensitive to the sharpness of the image displayed on the display 250. Therefore, if the compression rate of the image signal is increased as the ambient brightness is darker, the effect of power saving can be brought about without affecting the user's viewing environment.

Again, FIG. 6 will be described.

The processor 110 of the image transmission device 100 transmits an image signal compressed with an increased compression rate to the image reception device 200 through the wireless transmission unit 150 (S611).

The image reception device 200 decompresses the received image signal and then outputs the image (S613).

Meanwhile, the microcomputer 290 of the image reception device 200 operates its own power mode as the normal power mode when the ambient brightness is higher than the preset brightness (S615).

Figure 8:
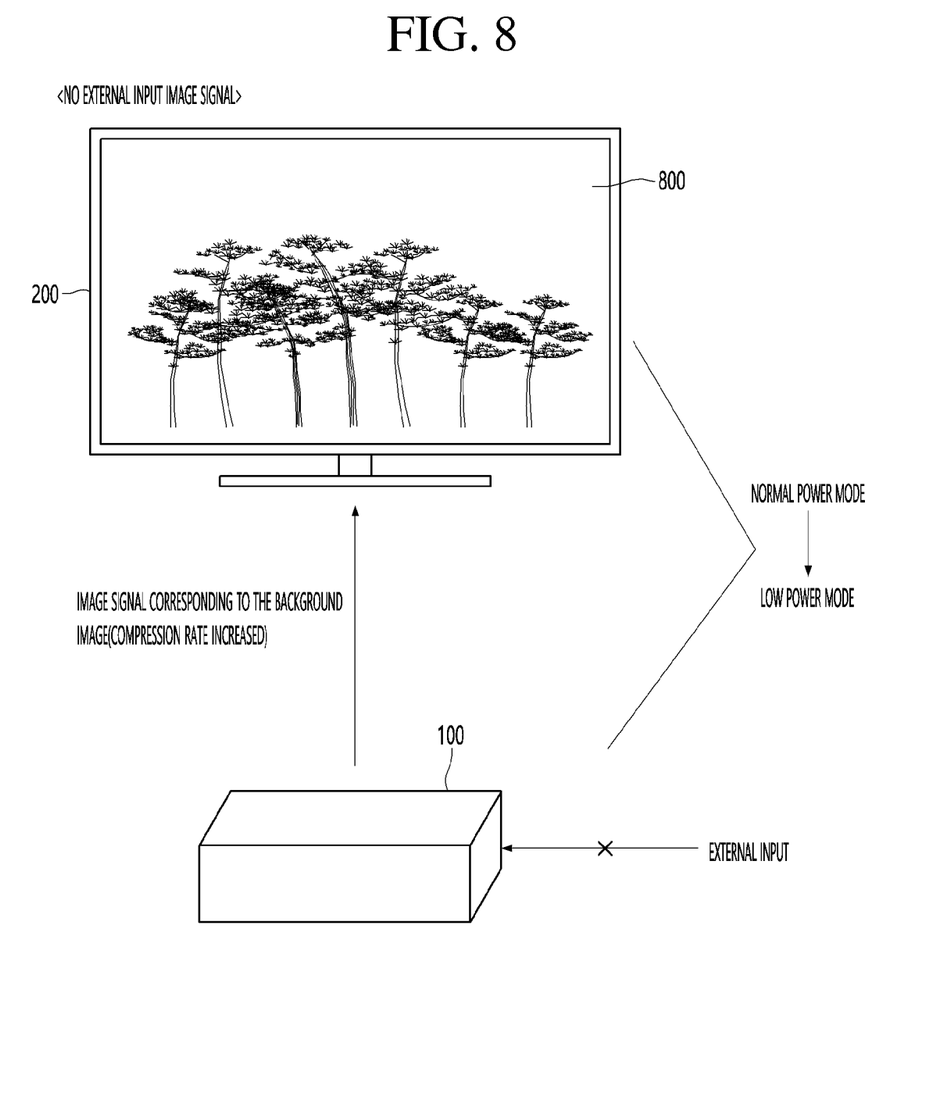
FIG. 8 is a diagram illustrating a process of switching to a low power mode if there is no image signal input from the outside according to an embodiment of the present disclosure.

FIG. 8 is a diagram illustrating a process of switching to a low power mode if there is no image signal input from the outside according to an embodiment of the present disclosure.

In FIG. 8, it is assumed that it is determined that there is no image signal being input to the image transmission device 100.

In addition, in FIG. 8, it is assumed that the image transmission device 100 and the image reception device 200 are paired with each other through the Bluetooth standard, and the power modes of the two devices are respectively in the normal power mode.

The image transmission device 100 may switch its own power mode to a low power mode when there is no image signal being input from the outside. At the same time, the image transmission device 100 may transmit a power mode change request message requesting the image reception device 200 to change the power mode of the image reception device 200 to a low power mode.

The image transmission device 100 may increase the compression rate of the image signal corresponding to the background image 800 and transmit the compressed image signal based on the increased compression rate to the image reception device 200 even if there is no image signal being input from the outside.

The image reception device 200 may display the background image 800 by restoring the image signal received from the image transmission device 100.

The restored image signal may be a signal corresponding to a standby image displayed on the display 250 in the low power mode of the image reception device 200.

The image transmission device 100 may reduce transmission power by changing an arrangement angle of an RF transmission antenna (not shown) transmitting an image signal in a low power mode.

As described above, according to an embodiment of the present disclosure, when an image signal is not being input from the outside, the display system operates in a low power mode, thereby reducing power consumption.

Next, FIG. 9 will be described.

Figure 9:
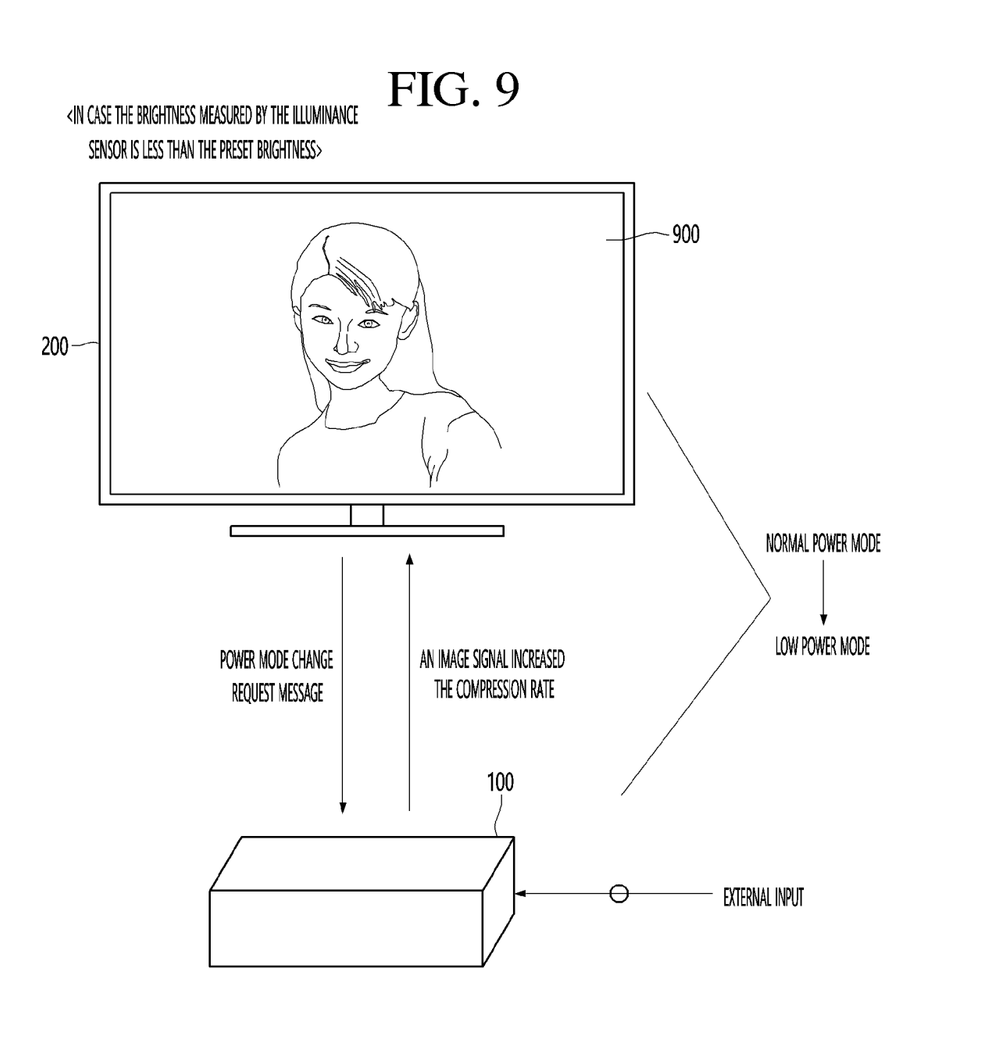
FIG. 9 is a diagram illustrating a process of switching to a low power mode if the brightness measured by the illuminance sensor included in the image reception device is less than a preset brightness.

FIG. 9 is a diagram illustrating a process of switching to a low power mode if the brightness measured by the illuminance sensor included in the image reception device is less than a preset brightness.

In FIG. 9, it is assumed that there is an image signal being input to the image transmission device 100 from an external input.

In addition, in FIG. 9, it is assumed that the image transmission device 100 and the image reception device 200 are paired with each other through the Bluetooth standard, and the power modes of the two devices are respectively in the normal power mode.

The image reception device 200 may transmit a power mode switching request message to the image transmission device 100 while switching its own power mode to a low power mode when the brightness measured by the illuminance sensor is less than the preset brightness.

The power mode change request message may be a message requesting to change the power mode of the image transmission device 100 to a low power mode.

The power mode change request message may further include the measured brightness.

The image transmission device 100 may switch its own power mode from the normal power mode to the low power mode according to the power mode change request message.

The image transmission device 100 may increase the compression rate of the image signal and transmit the compressed image signal based on the increased compression rate to the image reception device 200.

The image transmission device 100 may determine a compression rate corresponding to the measured brightness using the table 700 shown in FIG. 7 and adjust the content compression unit 130 to adjust the compression rate to the determined compression rate.

The image transmission device 100 may adjust the arrangement angle of the RF transmission antenna to lower the transmission power while increasing the compression rate of the image signal.

When the viewer's viewing environment is in a dark condition, it may be difficult for the viewer to notice a slight reduction in the image quality of the image signal. Accordingly, even if the compression rate of the image signal is increased, the viewer may not notice that the image quality of the image signal is reduced.

As described above, according to an embodiment of the present disclosure, when the viewer's surroundings are dark, power consumption can be reduced as the display system operates in the low power mode and the image quality is reduced, while the viewer's experience is unaffected as the viewer may not notice a change in image quality due to the darker viewing conditions.

According to an embodiment of the present disclosure, the above-described method can be implemented as a processor-readable code in a medium on which a program is recorded. Examples of media readable by the processor include ROM, RAM, CD-ROM, magnetic tape, floppy disk, optical data storage, and the like.

The above-described image transmission device is not limited to the configuration and method of the above-described embodiments, but the above embodiments are configured by selectively combining all or part of each embodiment so that various modifications can be made.

The invention claimed is:

1. An image transmission device comprising: a content compression unit configured to compress an image signal; a wireless transmission unit configured to wirelessly transmit the compressed image signal to an image reception device; and a processor configured to: switch a power mode of the image transmission device to a low power mode based on a determination that an image signal is not being received from an external source; and control the content compression unit to increase a compression rate of the image signal in the low power mode, wherein an image signal corresponding to a background image is transmitted to the image reception device when the image signal is not being received, and is subject for increasing the compression rate.

2. The image transmission device of claim 1, wherein the processor is further configured to control the wireless transmission unit to reduce a transmission power consumed in transmitting the image signal.

3. The image transmission device of claim 2, wherein the processor is further configured to adjust an arrangement angle of a radio frequency (RF) antenna included in the wireless transmission unit to reduce the transmit power.

4. The image transmission device of claim 1, wherein the processor is further configured to transmit a power mode switch request message to the image reception device through the wireless transmission unit requesting the image reception device to switch to a low power mode.

5. The image transmission device of claim 1, further comprising a signal input interface and a signal discrimination unit, wherein the signal discrimination unit determines whether the image signal is being received from an external source based on a signal output by the signal input interface.

6. The image transmission device of claim 5, further comprising a memory storing a data table comprising compression rates corresponding to various ambient brightness levels.

7. The image transmission device of claim 6, wherein the compression rate for the content compression unit is determined based on the stored data table using an ambient brightness at the image reception device.

8. The image transmission device of claim 1, wherein the wireless transmission unit comprises:
   one or more RF antennas configured to transmit the compressed image signal to the image reception device through RF communication; and
   a Bluetooth module for bi-directional communication with the image reception device.

* * * * *